United States Patent
Morgan et al.

(10) Patent No.: US 6,192,343 B1
(45) Date of Patent: Feb. 20, 2001

(54) SPEECH COMMAND INPUT RECOGNITION SYSTEM FOR INTERACTIVE COMPUTER DISPLAY WITH TERM WEIGHTING MEANS USED IN INTERPRETING POTENTIAL COMMANDS FROM RELEVANT SPEECH TERMS

(75) Inventors: Scott Anthony Morgan, Austin, TX (US); David John Roberts, Stockton (GB); Craig Ardner Swearingen; Alan Richard Tannenbaum, both of Austin, TX (US)

(73) Assignee: International Business Machines Corporation, Armonk, NY (US)

( * ) Notice: Under 35 U.S.C. 154(b), the term of this patent shall be extended for 0 days.

(21) Appl. No.: 09/213,845

(22) Filed: Dec. 17, 1998

(51) Int. Cl.$^7$ .............................. G10L 11/00; G10L 15/00
(52) U.S. Cl. ..................... 704/275; 704/270; 704/251; 704/231
(58) Field of Search ................................... 704/275, 251, 704/255, 270, 214

(56) References Cited

U.S. PATENT DOCUMENTS

| | | |
|---|---|---|
| 4,726,065 | 2/1988 | Foressl .................................... 381/41 |
| 4,766,529 | 8/1988 | Nakano et al. ..................... 364/513.5 |
| 5,027,406 | 6/1991 | Roberts et al. .......................... 381/43 |
| 5,068,900 | 11/1991 | Searcy et al. ............................ 381/43 |
| 5,133,011 | 7/1992 | McKiel, Jr. ............................. 381/43 |
| 5,157,384 | 10/1992 | Greanias et al. ...................... 340/706 |
| 5,222,146 | 6/1993 | Bahl et al. .............................. 381/41 |
| 5,231,670 | 7/1993 | Goldhor et al. ........................ 381/43 |
| 5,305,244 | 4/1994 | Newman et al. .................. 364/708.1 |
| 5,386,494 | 1/1995 | White et al. .......................... 395/2.84 |
| 5,408,582 | 4/1995 | Colier .................................... 395/2.52 |
| 5,428,707 | 6/1995 | Gould et al. ............................ 395/2.4 |
| 5,465,317 | 11/1995 | Epstein ................................. 395/2.45 |
| 5,500,920 | 3/1996 | Kupiec .................................. 395/2.79 |
| 5,526,407 | 6/1996 | Russell et al. .......................... 379/89 |
| 5,553,121 | 9/1996 | Martin et al. ........................... 379/88 |
| 5,602,963 | 2/1997 | Bissonnette et al. ................ 395/2.84 |

(List continued on next page.)

OTHER PUBLICATIONS

Creative Labs, Inc. ("VoiceAssist™ Development Documentation Book," Jul. 1993).*
Dragon Systems, Inc. ("DragonDictate™ User's Guide," Jul. 1996).*

*Primary Examiner*—Tālivadis I. Šmits
*Assistant Examiner*—Daniel A. Nolan
(74) *Attorney, Agent, or Firm*—J. B. Kraft; Leslie A. Van Leeuwen

(57) ABSTRACT

A speech recognition system which interprets speech queries such as help queries and presents a list of relevant proposed commands sorted in order based upon relevance of the commands. The system organizes the displayed commands being prompted to the user through probability determining means which for each of a predetermined plurality of speech commands store an associated set of speech terms, each term having relevance to its associated command combined with means responsive to a speech query for determining the probability of speech terms from said set in said query, and means responsive to said probability determining means for prompting the user with a displayed sequence of commands sorted based upon said probability of speech terms associated with said commands. When such a sorted command is selected, the system has means responsive to a speech command for carrying out the system action corresponding to the command.

The system also provides means for adding terms to previous speech terms wherein the probability determining means will redetermine probability to include such added terms. In such a situation, the probability determining means will redetermine the weights to include the additional weights of such added terms.

15 Claims, 9 Drawing Sheets

U.S. PATENT DOCUMENTS

| | | | |
|---|---|---|---|
| 5,604,840 | 2/1997 | Asai et al. | 395/11 |
| 5,632,002 | 5/1997 | Hashimoto et al. | 395/2.4 |
| 5,638,486 | 6/1997 | Wang et al. | 395/2.45 |
| 5,664,061 | 9/1997 | Andreshak et al. | 704/275 |
| 5,671,328 | 9/1997 | Fitzpatrick et al. | 395/2.55 |
| 5,698,834 | 12/1997 | Worthington et al. | 235/472 |
| 5,706,399 | 1/1998 | Bareis | 395/2.83 |
| 5,729,659 | 3/1998 | Potter | 395/2.79 |
| 5,774,859 * | 6/1998 | Houser et al. | 704/275 |
| 5,960,394 * | 9/1999 | Gould et al. | 704/275 |

* cited by examiner

SPEECH COMMAND INPUT RECOGNITION SYSTEM FOR INTERACTIVE COMPUTER DISPLAY WITH TERM WEIGHTING MEANS USED IN INTERPRETING POTENTIAL COMMANDS FROM RELEVANT SPEECH TERMS

CROSS-REFERENCE TO RELATED COPENDING PATENT APPLICATIONS

The following patent applications, which are assigned to the assignee of the present invention and filed concurrently herewith, cover subject matter related to the subject matter of the present invention: "SPEECH COMMAND INPUT RECOGNITION SYSTEM FOR INTERACTIVE COMPUTER DISPLAY WITH MEANS FOR CONCURRENT AND MODELESS DISTINGUISHING BETWEEN SPEECH COMMANDS AND SPEECH QUERIES FOR LOCATING COMMANDS", Scott. A. Morgan et al., Ser. No. 09/213,858; "SPEECH COMMAND INPUT RECOGNITION SYSTEM FOR INTERACTIVE COMPUTER DISPLAY WITH SPEECH CONTROLLED DISPLAY OF RECOGNIZED COMMANDS", Scott A. Morgan, Ser. No. 09/213,846; "SPEECH COMMAND INPUT RECOGNITION SYSTEM FOR INTERACTIVE COMPUTER DISPLAY WITH INTERPRETATION OF ANCILLARY RELEVANT SPEECH QUERY TERMS INTO COMMANDS", Scott A. Morgan et al., Ser. No. 09/213,856 and "METHOD AND APPARATUS FOR PRESENTING PROXIMAL FEEDBACK IN VOICE COMMAND SYSTEMS", Alan R. Tannenbaum, Ser. No. 09/213,857.

TECHNICAL FIELD

The present invention relates to interactive computer controlled display systems with speech command input and more particularly to such systems which present display feedback to query inputs from the interactive users.

BACKGROUND OF THE INVENTION

The 1990's decade has been marked by a technological revolution driven by the convergence of the data processing industry with the consumer electronics industry. This advance has been even further accelerated by the extensive consumer and business involvement in the Internet over the past few years. As a result of these changes it seems as if virtually all aspects of human endeavor in the industrialized world require human/computer interfaces. There is a need to make computer directed activities accessible to people who, up to a few years ago, were computer illiterate or, at best, computer indifferent.

Thus, there is continuing demand for interfaces to computers and networks which improve the ease of use for the interactive user to access functions and data from the computer. With desktop-like interfaces including windows and icons, as well as three-dimensional virtual reality simulating interfaces, the computer industry has been working hard to fulfill such interface needs by making interfaces more user friendly by making the human/computer interfaces closer and closer to real world interfaces, e.g. human/human interfaces. In such an environment it would be expected that speaking to the computer in natural language would be a very natural way of interfacing with the computer for even novice users. Despite these potential advantages of speech recognition computer interfaces, this technology has been relatively slow in gaining extensive user acceptance.

Speech recognition technology has been available for over twenty years, but it has only been recently that it is beginning to find commercial acceptance, particularly with speech dictation or "speech to text" systems such as those marketed by International Business Machines Corporation (IBM) and Dragon Systems. That aspect of the technology is now expected to have accelerated development until it will have a substantial niche in the word processing market. On the other hand, a more universal application of speech recognition input to computers, which is still behind expectations in user acceptance, is in command and control technology wherein, for example, a user may navigate through a computer system's graphical user interface (GUI) by the user speaking the commands which are customarily found in the systems menu text, icons, labels, buttons, etc.

Many of the deficiencies in speech recognition, both in word processing and in command technologies, are due to inherent voice recognition errors due in part to the status of the technology and in part to the variability of user speech patterns and the user's ability to remember the specific commands necessary to initiate actions. As a result, most current voice recognition systems provide some form of visual feed-back which permits the user to confirm that the computer understands his speech utterances. In word processing, such visual feedback is inherent in this process since the purpose of the process is to translate from the spoken to the visual. That may be one of the reasons that the word processing applications of speech recognition has progressed at a faster pace.

The above-referenced copending patent applications are directed toward making voice or speech command technology more user friendly and easier to use. Two of the applications are directed toward voice recognition systems and methods which interpret spoken inputs which are not commands, e.g. queries such as help queries and visual feedback present or prompt the user with lists of displayed proposed commands from which the user will, hopefully, find the appropriate command and then speak that command to the apparatus to initiate a desired action. "SPEECH COMMAND INPUT RECOGNITION SYSTEM FOR INTERACTIVE COMPUTER DISPLAY WITH INTERPRETATION OF ANCILLARY RELEVANT SPEECH QUERY TERMS INTO COMMANDS", Scott A. Morgan et al. (Attorney Docket No. AT9-98-343) is directed toward the provision of a relevance table including a basic active vocabulary provided by collecting from a computer operation—including the operating system and all significant application programs—all words and terms from menus, buttons and other user interface controls including the invisible but active words from currently active application windows, all names of macros supplied by the speech system, the application and the user, names of other applications that the user may switch to, generic commands that are generic to any application and any other words and terms which may be currently active. This basic active vocabulary is constructed into a relevance table, wherein each word or term will be related to one or more of the actual commands and, conversely, each of the actual commands will have associated with it a set of words and terms which are relevant to the command. "SPEECH COMMAND INPUT RECOGNITION SYSTEM FOR INTERACTIVE COMPUTER DISPLAY WITH MEANS FOR CONCURRENT AND MODELESS DISTINGUISHING BETWEEN SPEECH COMMANDS AND SPEECH QUERIES FOR LOCATING COMMANDS", Scott A. Morgan et al. (Attorney Docket No. AT9-98-344) is directed to the modeless or transparent transitions between the spoken query state when the user presents queries to search for desired commands and the command mode when the user controls the system by speaking the located actual commands. In the dynamic operation of the systems and methods covered by these copending applications, the user may still be barraged by a substantial number of displayed proposed commands.

SUMMARY OF THE PRESENT INVENTION

The present invention organizes the displayed commands being prompted to the user through probability determining means, which for each of a predetermined plurality of speech commands store an associated set of speech terms, each term having relevance to its associated command combined with means responsive to a speech query for determining the probability of speech terms from said set in said query, and means responsive to said probability determining means for prompting the user with a displayed sequence of commands sorted based upon said probability of speech terms associated with said commands. When such a sorted command is selected, the system has means responsive to a speech command for carrying out the system action corresponding to the command. Preferably, means for determining probability of speech terms weight said probability upon the firmness of recognition of the speech terms. Excellent results are achieved when in determining said probability, a firm recognition of a speech term is accorded twice the weight of an infirm recognition of the term.

In addition, there may be circumstances where the user in speaking a run of speech words and terms to seek out commands appropriate to his needs may use phrases which include actual commands. These spoken commands may be inadvertent and not the best commands for the user's purpose or they may be very pertinent. Therefore, in the sorting of displayed commands, any exact match of a speech term with any command doubles the weight accorded to that command in the sorting.

The system also provides means for adding terms to previous speech terms wherein the probability determining means will redetermine probability to include such added terms. In such a situation, the probability determining means will redetermine the weights to include the additional weights of such added terms.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
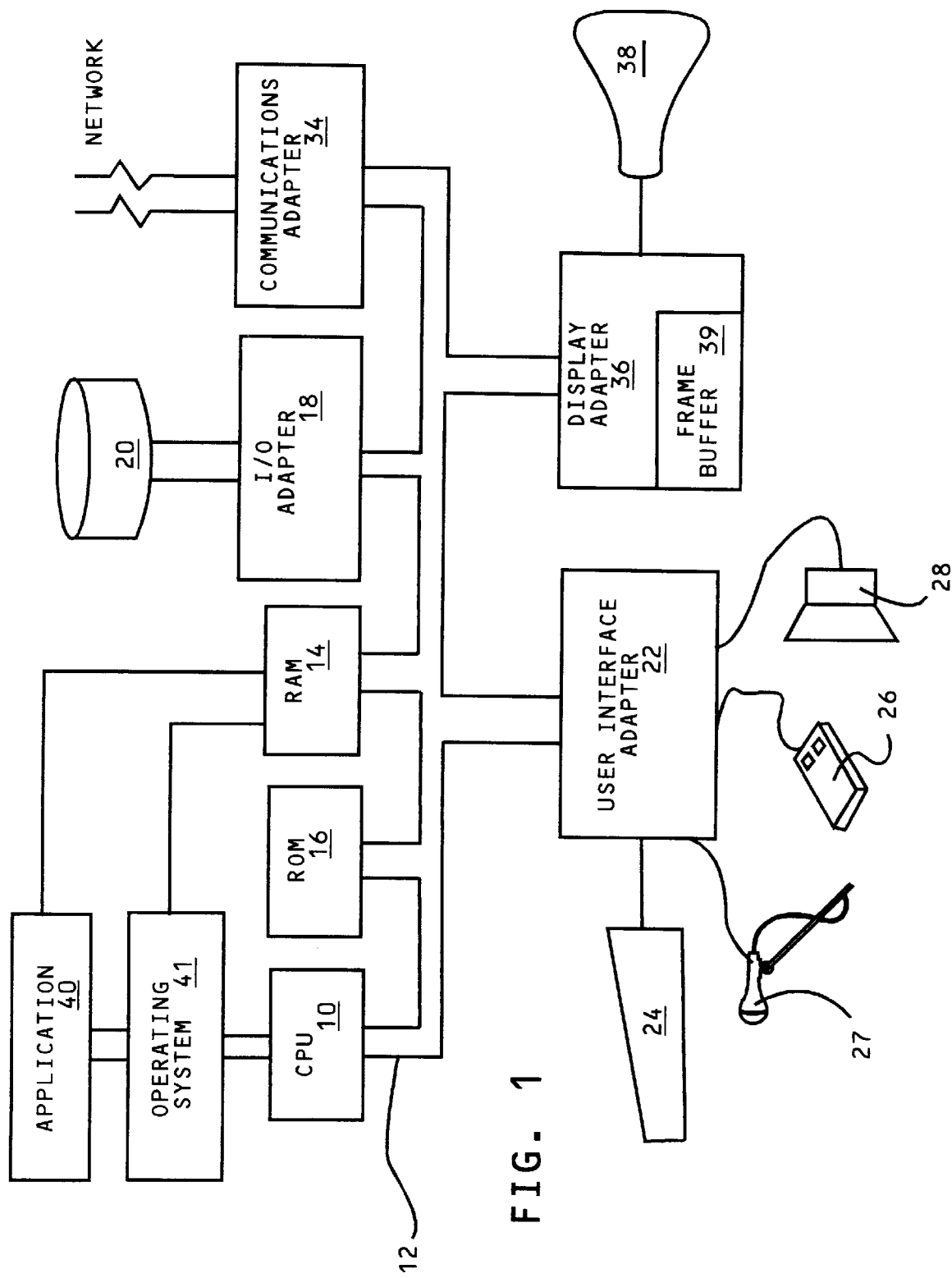
FIG. 1 is a block diagram of a generalized data processing system including a central processing unit which provide the computer controlled interactive display system with voice input used in practicing the present invention.

Referring to FIG. 1, a typical data processing system is shown which may function as the computer controlled display terminal used in implementing the system of the present invention by determining the probability of speech query terms being associated with commands and presenting a sequence of proposed commands sorted based upon the probability of the speech term being associated with such commands. A central processing unit (CPU) 10, such as any PC microprocessor in a PC available from IBM or Dell Corp., is provided and interconnected to various other components by system bus 12. An operating system 41 runs on CPU 10, provides control and is used to coordinate the function of the various components of FIG. 1. Operating system 41 may be one of the commercially available operating systems such as the OS/2™ operating system available from IBM (OS/2 is a trademark of International Business Machines Corporation); Microsoft's Windows 95™ or Windows NT™, as well as UNIX or AIX operating systems. A speech recognition program for interpreting speech term input and presenting proposed speech commands sorted based upon the weighted relevance of speech input terms to the particular commands, application 40, to be subsequently described in detail, runs in conjunction with operating system 41 and provides output calls to the operating system 41 which implement the various functions to be performed by the application 40. A read only memory (ROM) 16 is connected to CPU 10 via bus 12 and includes the basic input/output system (BIOS) that controls the basic computer functions. Random access memory (RAM) 14, I/O adapter 18 and communications adapter 34 are also interconnected to system bus 12. It should be noted that software components, including operating system 41 and application 40, are loaded into RAM 14, which is the computer system's main memory. I/O adapter 18 may be a small computer system interface (SCSI) adapter that communicates with the disk storage device 20, i.e. a hard drive. Communications adapter 34 interconnects bus 12 with an outside network enabling the data processing system to communicate with other such systems over a local area network (LAN) or wide area network (WAN), which includes, of course, the Internet. I/O devices are also connected to system bus 12 via user interface adapter 22 and display adapter 36. Keyboard 24 and mouse 26 are all interconnected to bus 12 through user interface adapter 22. Audio output is provided by speaker 28, and the speech input which is made through input device 27 which is diagrammatically depicted as a microphone that accesses the system through an appropriate interface adapter 22. The speech input and recognition will be subsequently described in greater detail, particularly with respect to FIG. 2. Display adapter 36 includes a frame buffer 39, which is a storage device that holds a representation of each pixel on the display screen 38. Images such as speech input commands, relevant proposed commands, as well as speech input terminology display feedback panels, may be stored in frame buffer 39 for display on monitor 38 through various components such as a digital to analog converters (not shown) and the like. By using the aforementioned I/O devices, a user is capable of inputting visual information to the system through the keyboard 24 or mouse 26 in addition to speech input through microphone 27 and receiving output information from the system via display 38 or speaker 28.

Figure 2:
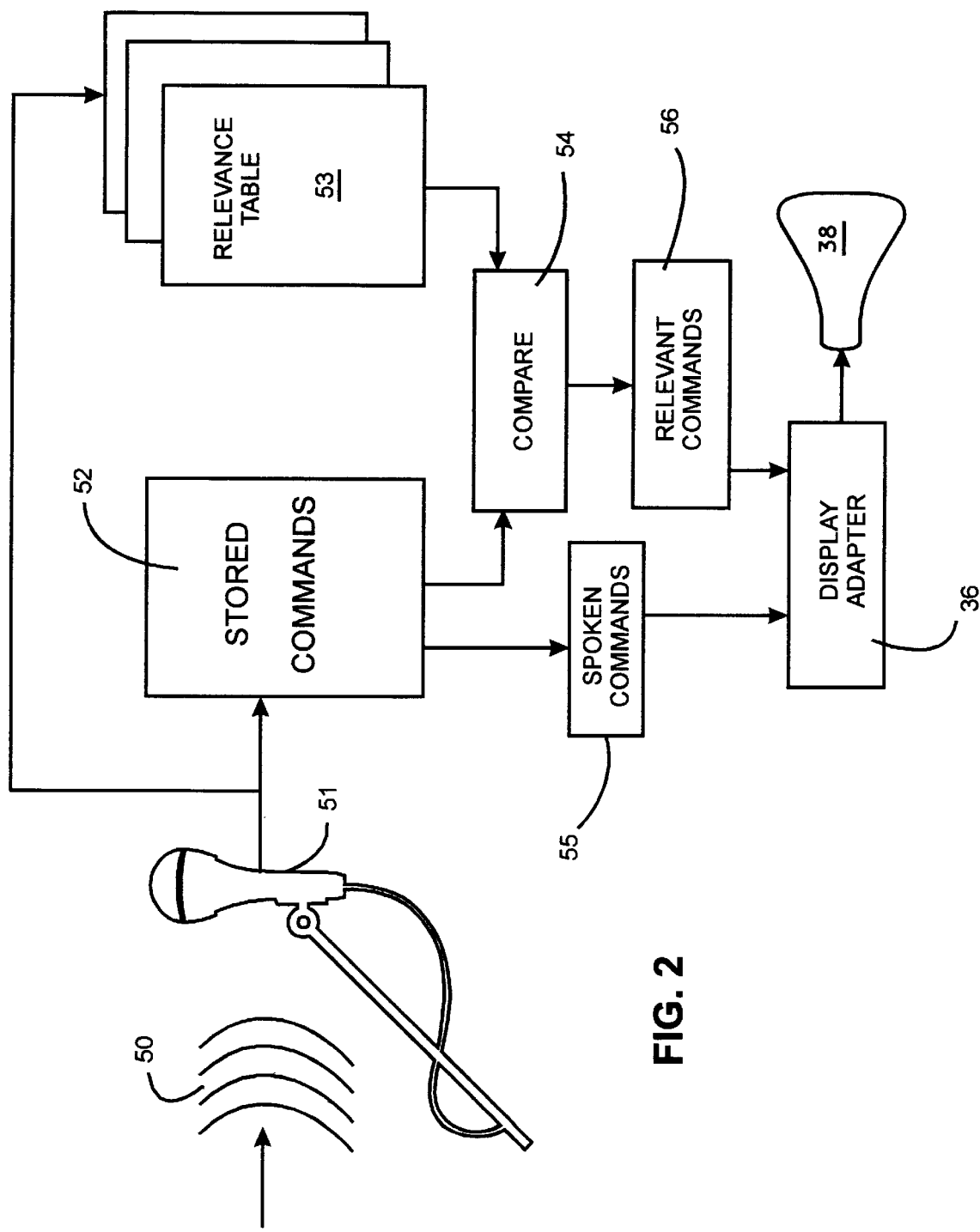
FIG. 2 is a block diagram of a portion of the system of FIG. 1 showing a generalized expanded view of the system components involved in the implementation.

Now with respect to FIG. 2, there will be described a system for carrying out recognized speech queries so as to locate commands appropriate to the terms of the query and to sort and display such proposed commands based upon the probability of relevance of the commands to such speech terms. The system is covered in the above described cross-referenced application: "SPEECH COMMAND INPUT RECOGNITION SYSTEM FOR INTERACTIVE COMPUTER DISPLAY WITH INTERPRETATION OF ANCILLARY RELEVANT SPEECH QUERY TERMS INTO COMMANDS", Scott A. Morgan et al. (Attorney Docket No. AT9-98-343). It should be noted that while this referenced application is the preferred method of locating commands applicable to the speech query, this invention is operable with any other process for searching for commands in response to spoken queries, such as "Help" queries. With respect to the general system components of FIG. 2, voice or speech input 50 is applied through microphone 51 which represents a speech input device. Since the art of speech terminology and speech command recognition is an old and well developed one, we will not go into the hardware and system details of a typical system which may be used to implement the present invention. It should be clear to those skilled in the art that the systems and hardware in any of the following patents may be used: U.S. Pat. No. 5,671,328, U.S. Pat. No. 5,133,111, U.S. Pat. No. 5,222,146, U.S. Pat. No. 5,664,061, U.S. Pat. No. 5,553,121 and U.S. Pat. No. 5,157,384. The speech input to the system could be actual commands, which the system will recognize, and/or speech terminology, which the user addresses to the computer in a query so that the computer may propose appropriate relevant commands through feedback. The input speech goes through a recognition process which seeks a comparison to a stored set of actual commands 52. If an actual command is clearly identified, actual command 55, that command may actually be carried out and then displayed via display adapter 36 to display 38 or the actual command may be displayed first and subsequently carried out. Where the speech input contains terminology other than actual commands, the assumption is that they are part of a speech query and the system provides for a relevance table 53, which is usually a comprehensive set of terms which may be used in any connection to each of the actual stored commands 52. If any of the input speech terms compare 54 with one of the actual commands, that actual command is characterized as a relevant command 56, which is then also presented to the user on display 38 via display adapter 36. The creation of the relevance table is described in detail in the above-mentioned copending application (Attorney Docket No. AT9-98-343) which is hereby incorporated by reference. Initially, an active vocabulary is determined. This includes collecting from a computer operation—including the operating system and all significant application programs—all words and terms from menus, buttons and other user interface controls including the invisible but active words from currently active application windows, all names of macros supplied by the speech system, the application and the user, names of other applications that the user may switch to, generic commands that are generic to any application and any other words and terms which may be currently active. This basic active vocabulary is constructed into a relevance table, wherein each word or term will be related to one or more of the actual commands and, conversely, each of the actual commands will have associated with it a set of words and terms which are relevant to the command. It should be noted that this relevance table is dynamic in that it may be added to as appropriate to each particular computer operation.

The present invention is preferably carried out by using the spoken query system of above-referenced copending application: "SPEECH COMMAND INPUT RECOGNITION SYSTEM FOR INTERACTIVE COMPUTER DISPLAY WITH MEANS FOR CONCURRENT AND MODELESS DISTINGUISHING BETWEEN SPEECH COMMANDS AND SPEECH QUERIES FOR LOCATING COMMANDS", Scott A. Morgan et al. (Attorney Docket No. AT9-98-344). This copending application involves seamless transitions between speech command modes of operation where speech commands are given to the system and the query mode of operation where spoken queries are given to the system from which the system may search for appropriate commands to be given to the system.

Figure 3:
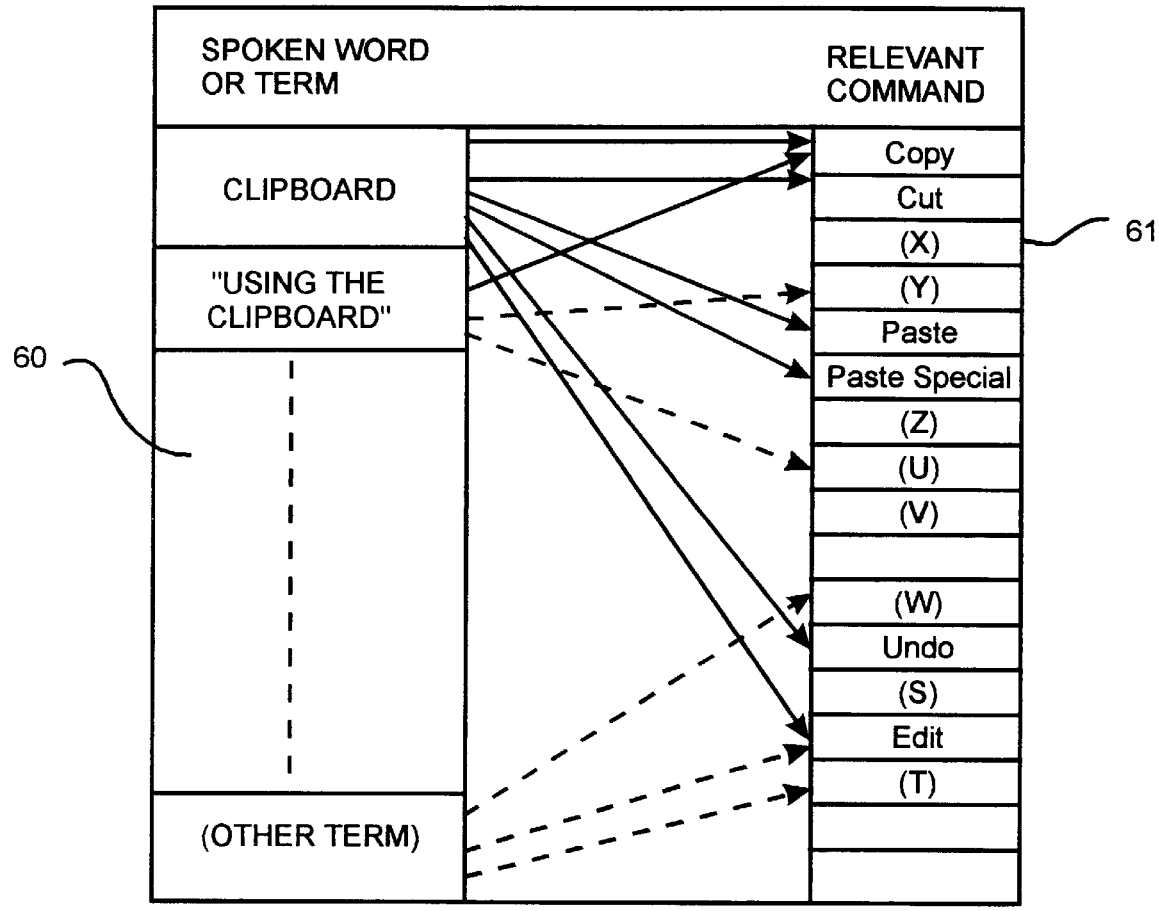
FIG. 3 is a generalized view of a portion of a relevance table showing the commands relevant to the speech terms in an illustrative example described in the specification.
Figure 4:
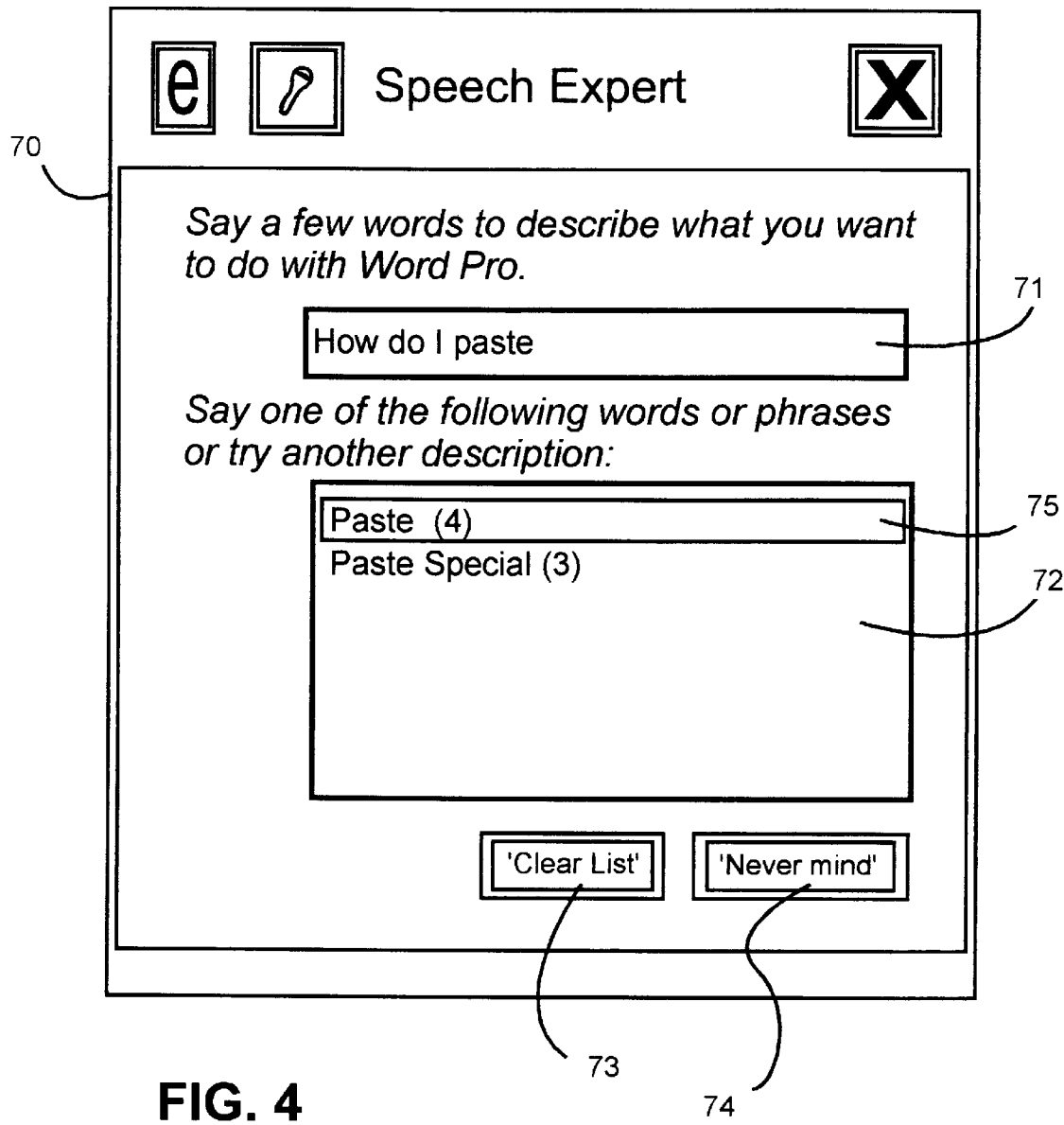
FIG. 4 is a diagrammatic view of a display screen on which an interactive dialog panel interface used for visual feedback when an initial speech command and/or speech query input has been made.
Figure 5:
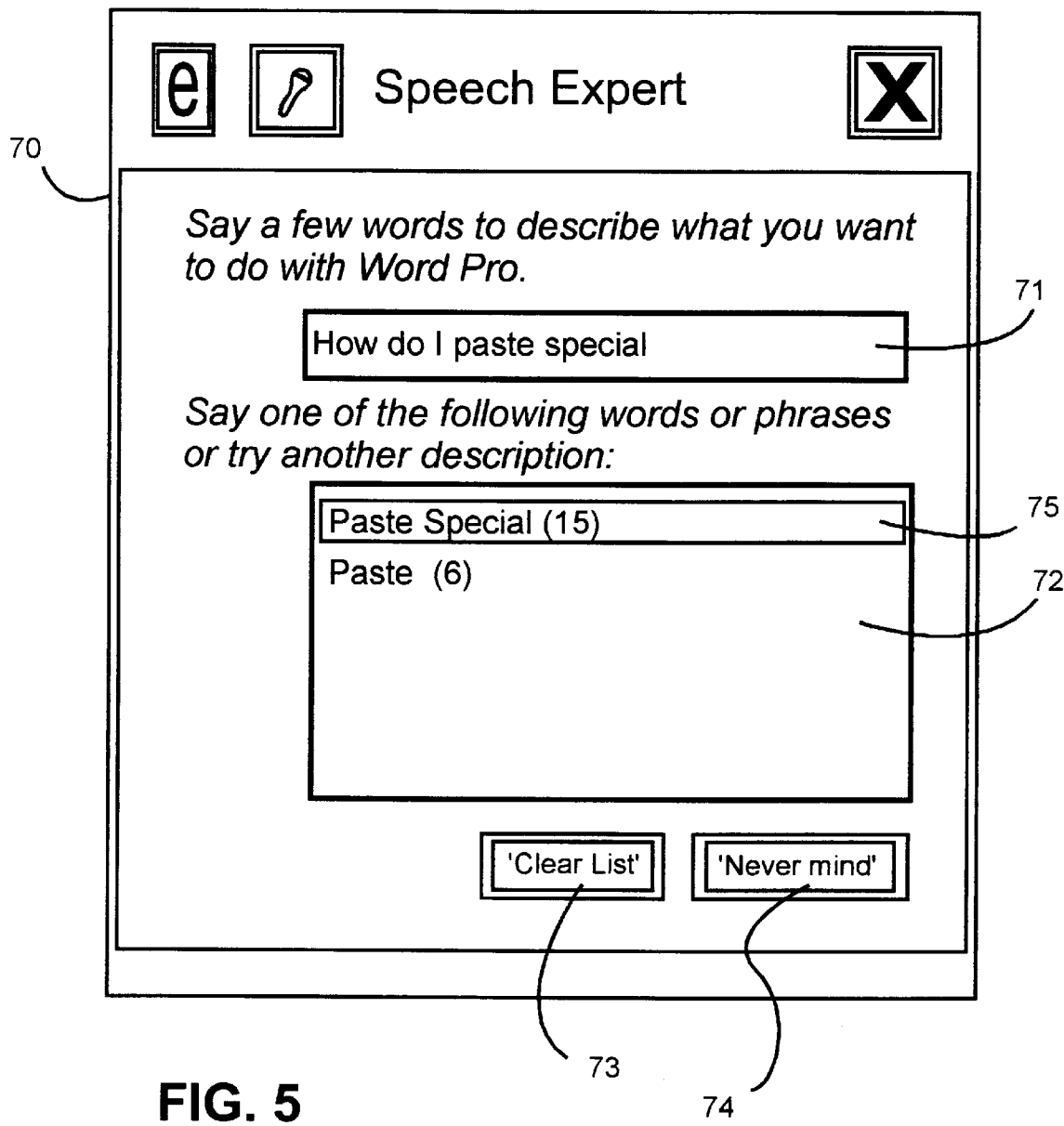
FIG. 5 is the display screen view of FIG. 4 after an additional speech query input has been made.
Figure 6:
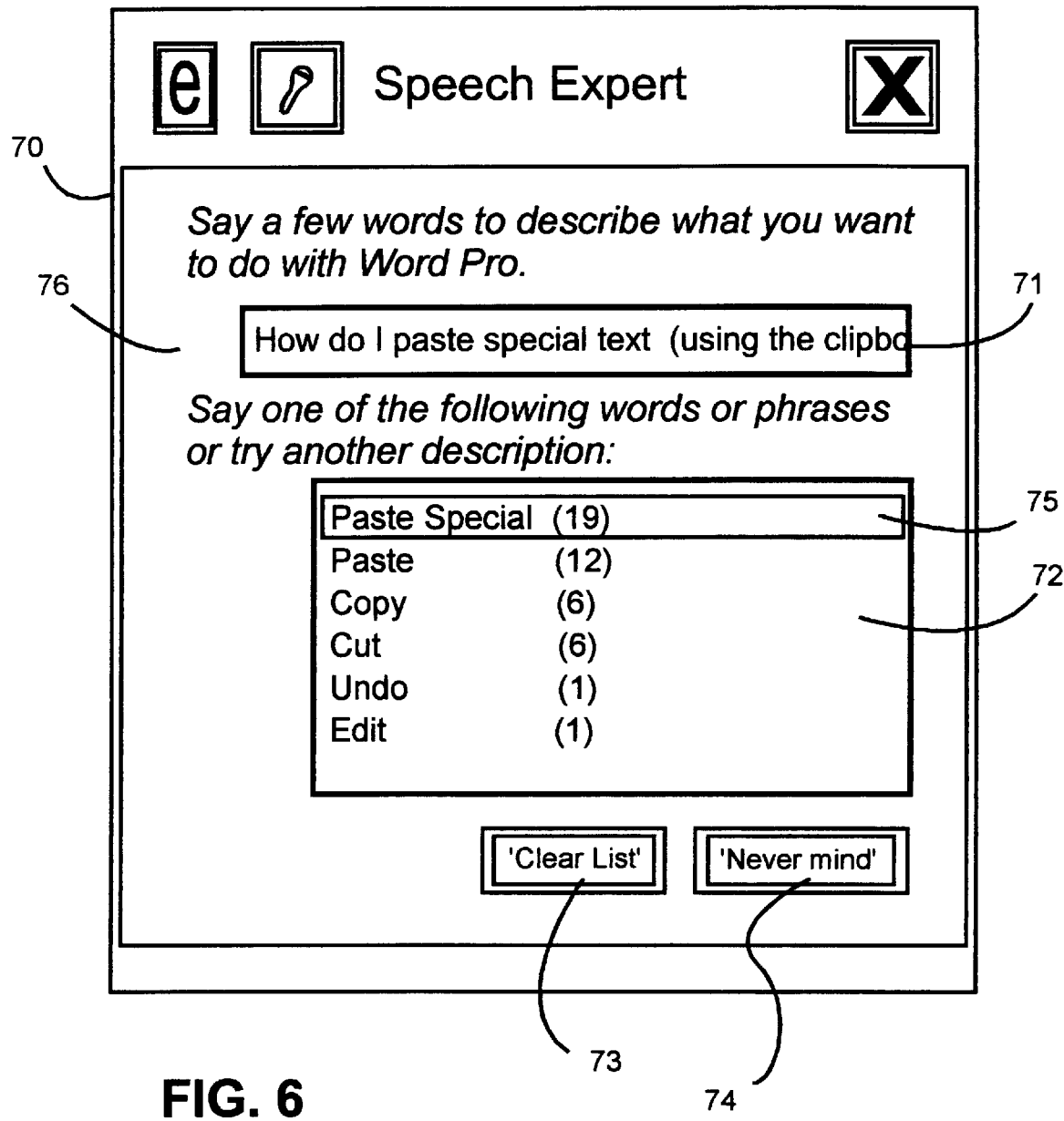
FIG. 6 is the display screen view of FIG. 5 after even more additional terms have been added to the speech query.

Now with respect to FIGS. 4 through 6, we will provide an illustrative example of how the present invention may be used to provide for the searching and weighting of relevant commands in accordance with the present invention. When the screen image panels are described, it will be understood that these may be rendered by storing image and text creation programs, such as those in any conventional window operating system in the RAM 14 of the system of FIG. 1. The display screens of FIGS. 3 through 7 are presented to the viewer on display monitor 38 of FIG. 1. In accordance with conventional techniques, the user may control the screen interactively through a conventional I/O device such as mouse 26, FIG. 1, and speech input is applied through microphone 27. These operate through user interface 22 to call upon programs in RAM 14 cooperating with the operating system 41 to create the images in frame buffer 39 of display adapter 36 to control the display panels on monitor 38.

The initial display screens of FIGS. 4 through 6 are of the same type as those described in the above-mentioned copending applications for making spoken queries to the system in order to search for relevant commands, except that the proposed commands will be ordered based upon the weighted sorting, which will be subsequently described in detail. FIGS. 4 through 6 will show how the weighted relevant commands are presented to the interactive user. The details of the actual weighting process and algorithm will be subsequently described in greater detail. FIG. 4 shows a display screen with visual feedback display panel 70. In the panel, window 71 will show the words that the user speaks, i.e. the speech query, while window 72 will display all of the relevant commands, i.e. commands which were not actually spoken, but some of the spoken words or phrases in the window 71 were associated with the relevant commands through the relevance table as shown in FIG. 2. Window 72 may also include commands which were an exact match for terms in the speech query. In other words, there may be circumstances where the user in speaking a run of speech words and terms to seek out commands appropriate to his needs may use phrases which include actual commands. These spoken commands may be inadvertent and not the best commands for the user's purpose or they may be very pertinent. Such commands are presented and sorted as will be subsequently described so that the user may choose them if there are pertinent. The panel also has command buttons: by pressing button 73 or saying the command "clear list" the user will clear both window 71 and window 72, FIG. 4, of all proposed relevant commands and input text. Pressing button 74 or saying the command "never mind" causes the whole application to go away.

The state of the panel in FIG. 4 is the state after the spoken query "How do I paste". The system could find no actual command having the query terminology and, thus, recognized that this was a query. Consequently, the query was displayed in window 71. Then the speech term is interpreted using the relevance table of FIG. 2 and the process and the algorithm to be described. The algorithm includes the following rules among others: a firm recognition of a speech term is accorded twice the weight of an infirm recognition. Also any exact match of a speech term with an actual command results in the command being included in the displayed list and doubles the weight accorded to the command for sorting purposes. Two relevant commands were found: "paste" and "paste special". These commands are shown in window 72 with their respective weights shown in parenthesis and the commands ordered or sorted so that the most significant command at this point, "paste", 75, is shown first and highlighted. Of course, the number of commands listed, as well as their respective order, will change as the user interactively speaks more in order to hone in on the desired commands. Thus, in FIG. 5 where the command has terms added to it so that it is now "How do I paste special", the weighting of the two sorted commands has changed so that the command 75, "paste special", is first and is highlighted. Further on in the interactive speech query process, FIG. 6, the query in window 71 has been expanded by further terminology to: "How do I paste special using the clipboard", the relevant commands presented to the user in window 72 have been reweighted and sorted with the result that the first command 75 still is "paste special", but four other relevant commands have been found: "copy", "cut", "undo" and "edit" and sorted based upon their respective weights shown in parenthesis.

At this point we will describe some of the general principles involved in carrying out the weighting according to the present invention. While our examples will use the algorithm wherein a firm recognition of a speech term with respect to a relevant command is accorded twice the weight of an infirm recognition and any exact match of a speech term with an actual command doubles the weight which would have been otherwise accorded to that command, it should be recognized that wide variations of these weighting proportions may be used in the practice of this invention.

The entire spoken input string is considered as a single entity, i.e. we are not parsing the firm words and then separately parsing the infirm words. By parsing the entire string, we retain those phrases that might span between both word types. An example of such a string might be "using the clipboard", which has relationship with many clipboard functions. With an input dictation string of "How can I be using the clipboard to copy text", with only the sub-string "How can I be using" considered firm, the relationship phrase "Using the clipboard" is still recognized even though it is part firm and part infirm.

Firm words are given double the weight of infirm words. In the above example of "using the clipboard", the word "using" would get a firm weight of two, while the words "the" and "clipboard" would each get an infirm weight of one (for a total weight for the string of four).

When searching through a relevant command table, exact matches for commands are counted twice. Words or phrases that are exact matches for valid commands are counted twice in determining their weight. For example, the word "copy" is an exact match for a valid clipboard command. Assuming it was firm, it would get a weight of four in the list (two for being firm and counted twice since the trigger word "copy" was an exact match for the command). A word like "clipboard", which has many relationships, but is not a valid command word, would generate a match with the word "copy", but in this instance "copy" would only get a weight of two (two for being firm, nothing extra since its trigger word "clipboard" was not an exact match for this command). The weight of multiword phrases is the sum of the weights for each word in the phrase, taking into account each word's "firmness". If the entire phrase is an exact match for a command, then the weight for the phrase is doubled.

For each match in the command string of a subphrase from the search query, an additional weight equivalent to one firm word is added to the weight for that command. Once all the commands are determined, an additional pass is made comparing each subphrase in the query to the subphrases in the command string. This gives added weight to those commands that are in the list because one or more of the exact words in the command were in the query as well.

By using the above-described weighting conventions to weight the intermediate results of a dynamic query process, particularly as it relates to the contextually-sensitive "firmness" of individual input data or words, the query results can be sorted and presented such that the more likely the choice is to being the desired action, the higher it is presented in the list. As more context becomes known through user additions to the query, the context of the query matches becomes higher and, hence, the list (of relevant commands) may dynamically change to reflect this confidence level.

We will now give a detailed example of the development of weighted relevant commands in response to search queries. First, referring to FIG. 3, we have a portion of a relevance table, e.g. table 53, FIG. 2, a list, 60 of words and terms, which may be used in the speech query, which have connections illustrated as lines (both solid and dashed) to respective commands on a relevant command list 61; each word or term has connections to a plurality of potential commands. If the word, such as "clipboard", on list 60, is included in the spoken query, then each of its associated commands, e.g. "copy", "paste", "cut", "paste", "paste special", "undo" will be included in the sorted displayed commands to be presented to the user and each of the commands will be given the weight accorded to the term clipboard based upon firmness or infirmness and the other parameters considered in the weighting process. Likewise, if the term, "using the clipboard" also on list 60, is included in the spoken query, then each of its associated commands, e.g. "copy", "cut" and "paste" will be included in the sorted displayed commands to be presented to the user and each of the commands will be given the weight accorded to the term clipboard based upon firmness or infirmness and the other parameters considered in the weighting process.

In general firm terms are understood in the art to be terms which the voice recognition "engine" doing the decoding has completed such decoding and recognized as definite or firm words. Infirm words are those which the engine is still decoding. One or more infirm words could eventually become a single firm word, and a single infirm word could result in one or more firm words. In many query applications,there may be a substantial latency between when a word is spoken and when it is decoded or declared firm. The processing of firm and infirm words is used and described in greater detail in the document, "SMAPI Developer's Guide for IBM ViaVoice for Windows, Version 1.01" available from IBM Corp. in connection with the IBM ViaVoice SDK product.

It should be noted in connection with the table of FIG. 3 that as set forth hereinabove, the spoken query (which is not the case in FIG. 3) may include terms or words which are an exact match for on the listed commands. In such a case, in the sorting of displayed commands, any exact match of a speech query term with any command doubles the weight accorded to that command in the sorting and if the command were not previously displayed, it will now be displayed.

Using the elements of the relevance table portion of FIG. 3 and the principles set forth above, we will run through an example of dynamic weighting as the user adds terms.

In the example, underlined words will be considered to be firm, non-underlined words are not yet firm. The numbers in parenthesis beside each command listed under "Results:" represents first, the number of "hits" (or the number of different rules which caused the command to appear in the list) and second, the total "weight" assigned to each command.

[1] Spoken Input: "How do I paste"
Notes: The word "paste" in the input is found in two commands. It is not yet firm.
Results:
- Paste (1,4)
Hit: "paste"
Score: One for the single word hit, then doubled to two because it is an exact match for the command, plus two more for the second pass finding the hit "paste" to be a subphrase of the command found.
- Paste special (1,3)
Hit: "paste"
Score: One for the single word hit, plus two more for the second pass finding the hit "paste" to be a subphrase of the command found.
This is the state shown in FIG. 4.
- - -
[2] Next spoken input: "How do I paste"
Notes: The word "paste" in the input has now become firm.
- Paste (1,6)
Score: One for the single word hit, then doubled to two for being firm, then doubled to four because it is an exact match for the command, plus two more for the second pass finding the hit "paste" to be a subphrase of the command found.
- Paste special (1,4)
Score: One for the single word hit, then doubled to two for being firm, plus two more for the second pass finding the hit "paste" to be a subphrase of the command found.
- - -
[3] Next spoken input: "How do I paste special"
Notes: The phrase "paste special" is split with only "paste" being firm but "special" currently not yet firm.
Results:
- Paste special (3,15)
Score: Three hits: "paste" is one hit, the same as in [2] above (for four points); "special" is also a single word hit (for three points), just like the non-firm "paste" was in [1] above; "paste special" is the third hit for two points for the two word hit, plus another point since "paste" is firm, then doubled to six because it is an exact match for the command, plus two more for the second pass finding the hit "paste special" to be a subphrase of the command found (for eight points).
Total: 4+3+8=15 points.
- Paste (1,6)
Score: Same as in [2] above since the additional word has no contribution to this command. Note that the order of the results has changed here since the command "paste special" now has a higher weight than "paste".
This is the state shown in FIG. 5.
- - -

[4] Next spoken input: "How do I paste special text using the"
Notes: The entire phrase "paste special" is now firm.
Results:
- Paste special (3,18)
Score: Same as in [3] above except "special" is now firm as well. Three hits: "paste" is one hit, the same as in [2] above for four points; "special" is also now a single word hit for four points, just like the firm word "paste" was; "paste special" is the third hit for two points for a two word hit, plus another two points since both words are firm, then doubled to eight points because it is an exact match for the command; and then two more for the second pass finding the hit "paste special" to be a subphrase of the command found for ten points. Total: 4+4+10=18 points.
- Paste (1,6)
Score: Same as in [3] above.
- - -
[5] Next spoken input: "How do I paste special text using the clipboard"
Notes: Two speech terms from the relevancy table portion shown in FIG. 3 are added: "using the clipboard" and "clipboard". The table in FIG. 3 shows the relevant commands which these two speech terms are associated with.
Results:
- Paste special (4,19)
Score: Same as in [4] above except that "clipboard" is an associated speech term for this command and, thus, a fourth hit. Since it is not yet firm, it scores only one extra point, for a total of 19.
- Paste (3,12)
Score: Two extra hits more than in [4] above since both "clipboard" and "using the clipboard" are associated speech terms for this command, plus three points for the three word associated speech term, plus two points because two of the words in the phrase are firm, plus one point for the not yet firm associated term "clipboard", for a total of six extra points, beyond [4] above, for a total of 12 points.
- Copy 2,6)
Score: Two hits, the same as the command "paste" received, for the associated terms: "using the clipboard" and "clipboard" for the same six points.
- Cut (2,6)
Score: Same as "copy" for the same reasons.
- Undo (1,1)
Score: One hit from the not yet firm "clipboard" for one point.
- Edit (1,1)
Score: Same as "undo" for the same reasons.
This is the state shown in FIG. 6.
- - -
[6] Next spoken input: "How do I paste special using the clipboard"
Notes: Finally, the whole phrase is firm.
Results:
- Paste special (4,20)
Score: One extra point for "clipboard" now being a firm word.
- Paste (3,14)
Score: Two extra points since "clipboard" is firm and since "clipboard" is used in two separate associated terms for this command, the word by itself and in the phrase "using the clipboard".
- Copy (2,8)
Score: Two extra points for the same reason as the "paste" command.

- Cut (2,8)
    Score: Same as "copy" for the same reasons.
- Undo (1,2)
    Score: One extra point since only one hit on the single word "clipboard" and since "undo" is not a command associated with the speech term "using the clipboard".
- Edit (1,2)
    Score: Same as "undo" for the same reasons.

Figure 7:
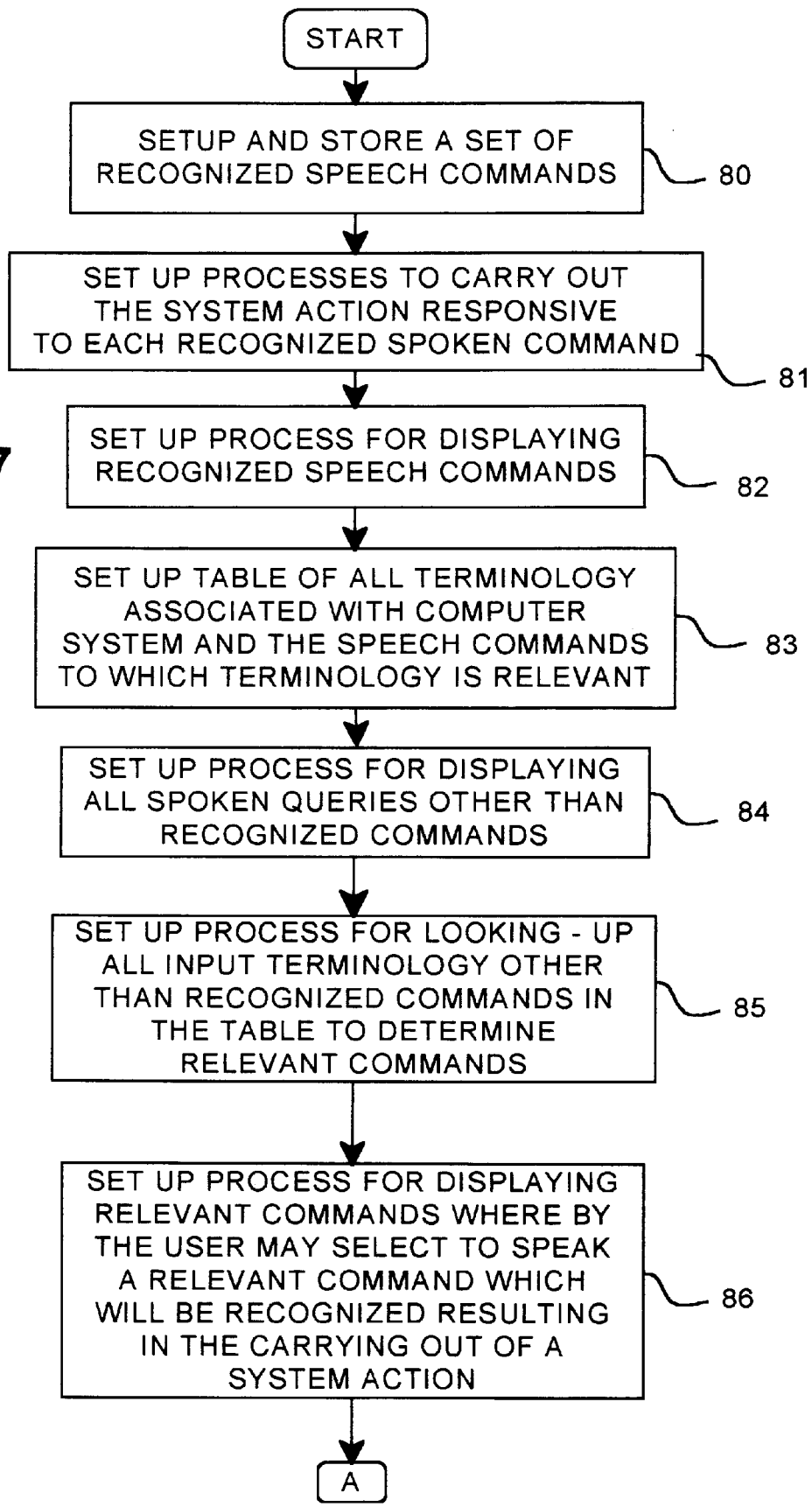
FIGS. 7 and 8 combine into a flowchart of the basic elements of the system and program in a computer controlled display system for prompting with a weighted list of relevant commands in response to speech query input in accordance with the present invention.
Figure 8:
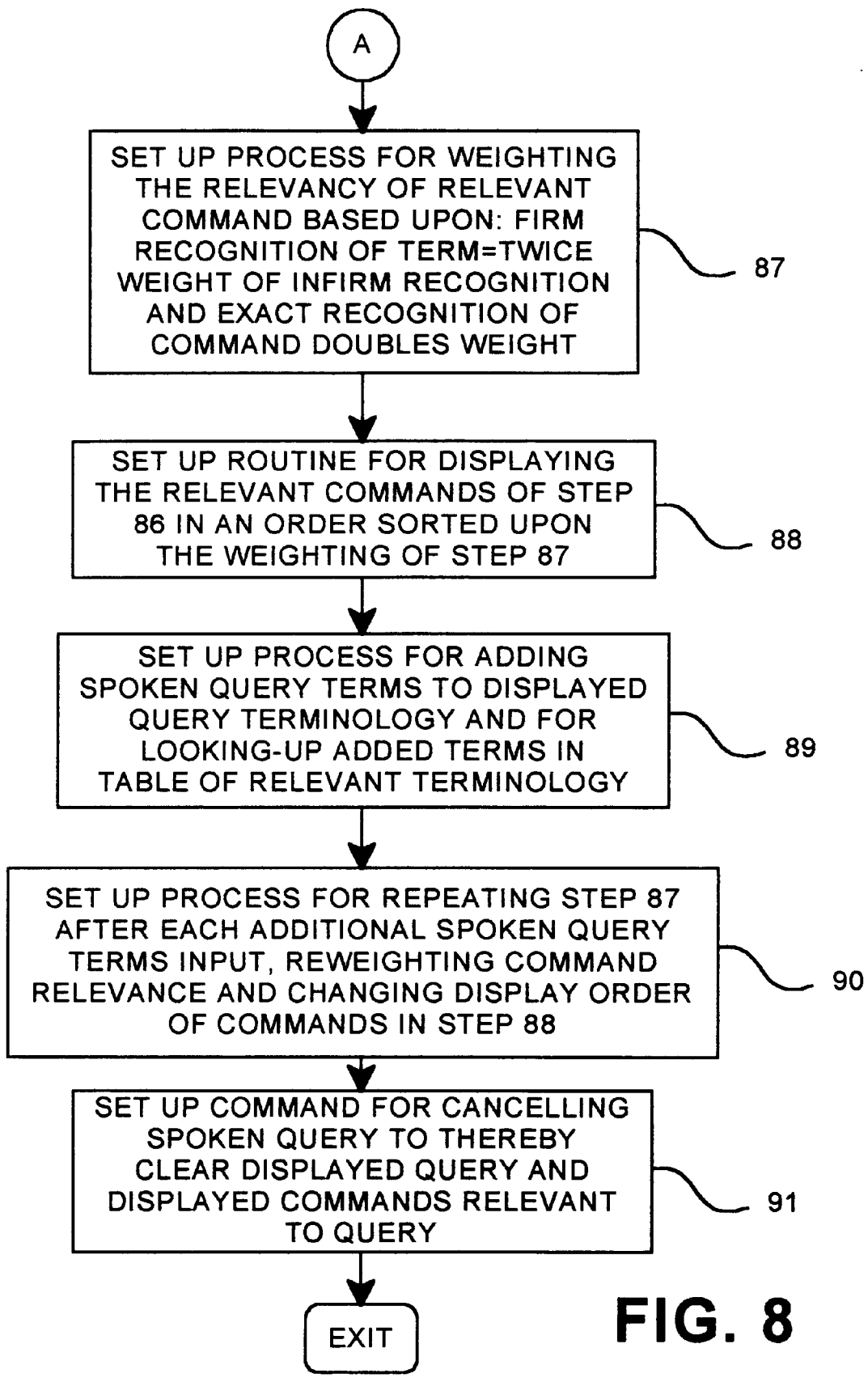
Figure 9:
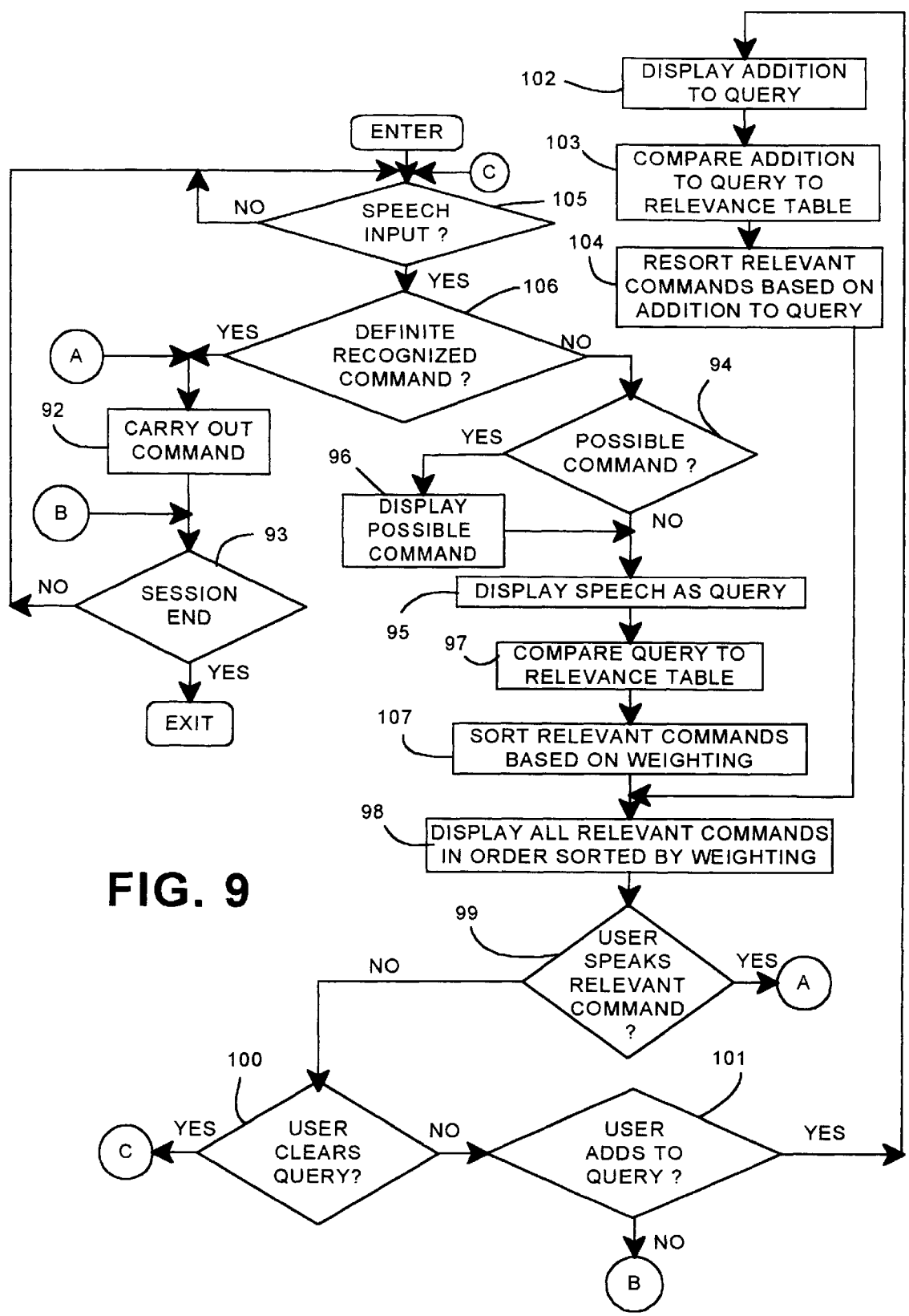
FIG. 9 is a flowchart of the steps involved in a typical run of the program set up in FIGS. 8 and 9.

Now with reference to FIGS. 7, 8 and 9, we will describe a process implemented by the present invention in conjunction with the flowcharts of these figures in which the weighting algorithms described above may be applied. FIGS. 7 and 8 combine into a flowchart showing the development of a process according to the present invention for the interpretation of speech queries into proposed weighted relevant commands. First, step 80, a set of recognizable spoken commands, which will drive the system being used, is set up and stored. Then, there are set up appropriate processes to carry out the actions called for by each recognized speech command, step 81. A process for displaying recognized speech commands is also set up. In doing so, the program developer has the option, among others, of displaying all recognized commands or only recognized commands which are not clearly recognized so that the user will have the opportunity of confirming the command. Then, step 83, there is set up a relevance table or table of relevant commands as previously described, particularly with respect to copending application, "SPEECH COMMAND INPUT RECOGNITION SYSTEM FOR INTERACTIVE COMPUTER DISPLAY WITH INTERPRETATION OF ANCILLARY RELEVANT SPEECH QUERY TERMS INTO COMMANDS, Scott A. Morgan et al. (Attorney Docket No. AT9-98-343). This table, which hopefully includes substantially all terminology associated with the computer system and the actual commands to which each term is relevant, has been described with respect to FIGS. 2 and 3. A process for displaying all spoken inputs other than recognized commands, i.e. speech queries, is then set up, step 84. A process for looking up all spoken inputs other than recognized commands, i.e. speech queries, on this relevance table to then determine relevant commands is set up, step 85. This has been previously described with respect to FIG. 2. Then, there is set up a process for displaying relevant commands so that the user may choose a relevant command by speaking to set off the command action, step 86. This has been previously described with respect to FIG. 5. At this point the set up process continues on to FIG. 9 via branch "A". There is set up a process for weighting the relevancy of each relevant command based upon the algorithm: Firm recognition=Twice Infirm recognition, step 87. Also provided is a routine to handle situations where an actual command shows up as part of the spoken query seeking relevant commands. In considering this situation, we are assuming for purpose of this example that the system is in the query mode as distinguished from the basic command mode of operation. Above referenced copending application, "SPEECH COMMAND INPUT RECOGNITION SYSTEM FOR INTERACTIVE COMPUTER DISPLAY WITH MEANS FOR CONCURRENT AND MODELESS DISTINGUISHING BETWEEN SPEECH COMMANDS AND SPEECH QUERIES FOR LOCATING COMMANDS", Scott A. Morgan et al. (Attorney Docket No. AT9-98-344) involves seamless transitions between speech command modes of operation where speech commands are given to the system and the query mode of operation where spoken queries are given to the system from which the system may search for appropriate commands to be given to the system. The system should be able to distinguish the straightforward command mode of operation from the context of the spoken term. For example, if the spoken term is the singular command with no terminology surrounding it, the system may be set up to display and then conventionally carry out the command without going into the weighting process of the present invention. On the other hand, if the command shows up in the middle of a query involving a sequence of words and terms which are not commands, then, we are in the query mode, and the command must be processed and weighted along with the other query terminology. When processed as part of the spoken query, if a spoken term is an exact match for a command, then the weighted value which would be given to the command for sorting is doubled.

Next, with respect to FIG. 8, step 88, a routine is set up for displaying the relevant commands of step 86 sorted based upon the weighting of step 87. A process is then set up for adding recognized noncommand terms, i.e. query terms, to the already displayed prior query terms and for looking up such relevant terms in the table of relevant terms, step 89. Also, a process is set up, step 90, for repeating step 87 after each additional spoken query term input, reweighting the command relevance and changing the display order of commands in step 88. Finally, a process is set up for a recognized spoken cancel or clear command which cancels the prior spoken query along with any relevant displayed commands, step 91, whereby the user may speak an entirely new query. This has been previously described with respect to FIG. 4.

The running of the process will now be described with respect to FIG. 9. First, step 105, a determination is made as to whether there has been a speech input. If No, then the input is returned to step 105 where a spoken input is awaited. If the decision from step 105 is Yes, then a further determination is made in decision step 106 as to whether an actual command has been definitely recognized. If Yes, then the command is carried out, step 92, and then a determination is made as to whether the session is at an end, step 93. If Yes, the session is exited. If No, the flow is returned to step 105 where a further spoken input is awaited. If the decision from step 106 was No, that a definite command was not recognized, then a further decision is made step 94 as to whether there is a possible command within the spoken input. If Yes, then the command is displayed, step 96 so that the user now has an opportunity to confirm the command by repeating it more precisely. By a possible command, we mean that a term which matches a command is recognized in the spoken input but within that context, it appears that the user has not intended it to be a definite command. In such a situation, the user is given the opportunity to select or confirm the command by displaying the command, most conveniently weighted along with the relevant commands displayed in step 98 as will be subsequently described in detail. At this point or if the decision from step 94 was No, i.e., no recognizable command, then, the speech is displayed as a speech query, step 95. Up to this point, the process is substantially the same as that covered in the above referenced copending patent applications, (Attorney Reference Nos. AT9-98-344 and AT9-98-343). At this point, in accordance of the process of the present invention, comparison is made on the relevance table as previously described, step 97, and the relevant commands are sorted based on the weighting process and algorithm which have previously described in detail, step 107. Then, all relevant commands are displayed in an order sorted by weighting as previously described, step 98 to give the user the opportunity to select one of the relevant commands. Decision step 99, a determination is made as to whether the user has spoken one of the relevant commands. If Yes, then the process is returned to step 92 via branch "A", and the command is carried out. If the decision from step 99 is No, then, decision step 100, a determination is made as to whether the user has given a command to clear the last speech query; if Yes, the process is returned to initial decision step 105 through branch "C". If No from step 100, a further determination is made, step 101, as to whether the user has spoken any terms to be added to the last query. If No, the process is returned to decision step 93 via branch "B", and a determination is made as to whether the session is at an end as previously described. If the decision from step 101 is Yes, then step 102, the addition to the query is displayed added to the original displayed query as described in connection with FIGS. 5 and 6, and the query addition is compared to the relevance table, step 103. Also, the resulting relevant commands are reweighted and resorted based on the new additions, step 104, and the additional relevant and resorted commands displayed, back to step 98 from which point the process proceeds as previously described to give the user the opportunity to select one of the relevant commands. Decision step 99, a determination is made as to whether the user has spoken one of the relevant commands from which point, the process proceeds as described above.

One of the preferred implementations of the present invention is as an application program 40 made up of programming steps or instructions resident in RAM 14, FIG. 1, during computer operations. Until required by the computer system, the program instructions may be stored in another readable medium, e.g. in disk drive 20, or in a removable memory such as an optical disk for use in a CD ROM computer input, or in a floppy disk for use in a floppy disk drive computer input. Further, the program instructions may be stored in the memory of another computer prior to use in the system of the present invention and transmitted over a LAN or a WAN, such as the Internet, when required by the user of the present invention. One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

What is claimed is:

1. In a user interactive computer controlled display system with speech command input recognition comprising, apparatus for interpreting speech queries to locate commands comprising:

means for predetermining a plurality of speech commands each associated with a corresponding plurality of system actions, means responsive to a speech command for carrying out the system action corresponding to the command, means for storing for each of said plurality of commands, an associated set of speech terms, each term having relevance to its associated command, means responsive to a speech query for determining the probability of speech terms from said set in said query by applying a weight factor for a firm recognition of a speech term at least twice the weight of an infirm recognition of the term, and means responsive to said probability determining means for prompting the user with a displayed sequence of commands sorted based upon said probability of speech terms associated with said commands.

2. The apparatus of claim 1 wherein in determining said probability, an exact match of a speech term in said query with one of said plurality of commands doubles the weight accorded to the command in sorting of said command.

3. The apparatus of claim 1 further including means for enabling the user to speak a command in said sorted sequence of commands to thereby initiate the system action associated with the command.

4. The apparatus of claim 1 further including means for adding terms to previous speech terms wherein the probability determining means will redetermine probability to include such added terms.

5. The apparatus of claim 2 further including means for adding terms to previous speech terms wherein the probability determining means will redetermine the weights to include the additional weights of such added terms.

6. In a user interactive computer controlled display system with speech command input recognition comprising, a method for interpreting speech queries to locate commands comprising:

predetermining a plurality of speech commands each associated with a corresponding plurality of system actions, responsive to a speech command, carrying out the system action corresponding to the command, storing for each of said plurality of commands, an associated set of speech terms, each term having relevance to its associated command, responsive to a speech query, determining the probability of speech terms from said set in said query by applying a weight factor for a firm recognition of a speech term at least twice the weight of an infirm recognition of the term, and responsive to said probability determination, prompting the user with a displayed sequence of commands sorted based upon said probability of speech terms associated with said commands.

7. The method of claim 6 wherein in determining said probability, an exact match of a speech term in said query with one of said plurality of commands doubles the weight accorded to the command in sorting of said command.

8. The method of claim 6 further including the step of enabling the user to speak a command in said sorted sequence of commands to thereby initiate the system action associated with the command.

9. The method of claim 6 further including the step of adding terms to previous speech terms wherein said probability determination will redetermine the probability to include such added terms.

10. The method of claim 7 further including the step of adding terms to previous speech terms wherein said probability determination will redetermine the weights to include the additional weights of such added terms.

11. A computer program having program code included on a computer readable medium for interpreting speech queries to locate commands in an interactive computer controlled display system with speech command input comprising:

means for predetermining a plurality of speech commands each associated with a corresponding plurality of system actions, means responsive to a speech command for carrying out the system action corresponding to the command, means for storing for each of said plurality of commands, an associated set of speech terms, each term having relevance to its associated command, means responsive to a speech query for determining the probability of speech terms from said set in said query by applying a weight factor for a firm recognition of a speech term at least twice the weight of an infirm recognition of the term, and means responsive to said probability determining means for prompting the user with a displayed sequence of commands sorted based upon said probability of speech terms associated with said commands.

12. The computer program of claim 11 wherein in determining said probability, an exact match of a speech term in said query with one of said plurality of commands doubles the weight accorded to the command in sorting of said command.

13. The computer program of claim 11 further including means for enabling the user to speak a command in said sorted sequence of commands to thereby initiate the system action associated with the command.

14. The computer program of claim 11 further including means for adding terms to previous speech terms wherein the probability determining means will redetermine probability to include such added terms.

15. The computer program of claim 12 further including means for adding terms to previous speech terms wherein the probability determining means will redetermine the weights to include the additional weights of such added terms.

* * * * *